United States Patent [19]

Cochran

[11] 4,043,105
[45] Aug. 23, 1977

[54] ELECTRO-PNEUMATIC FRUIT PICKER

[76] Inventor: Robert W. Cochran, 152 Bonny Shores Drive, Lakeland, Fla. 33801

[21] Appl. No.: 596,504

[22] Filed: July 16, 1975

[51] Int. Cl.² .......................................... A01D 46/24
[52] U.S. Cl. ..................................... 56/328 R; 56/333
[58] Field of Search .................... 56/328 R, 331, 333; 47/1.3

[56] References Cited

U.S. PATENT DOCUMENTS

| | | | |
|---|---|---|---|
| 1,250,140 | 12/1917 | Chapman | 47/1.3 UX |
| 3,233,396 | 2/1966 | Gallo | 56/328 R |
| 3,460,330 | 8/1969 | Black, Jr. | 56/328 R |
| 3,564,826 | 2/1971 | Middletown, Jr. | 56/328 R |
| 3,564,827 | 2/1971 | Negrul et al. | 56/331 |
| 3,913,307 | 10/1975 | Cardinal, Jr. | 56/328 R |
| 3,935,670 | 2/1976 | Pluenneke et al. | 47/1.3 |
| 3,969,878 | 7/1976 | Morganeier | 56/328 R |

*Primary Examiner*—J.N. Eskovitz
*Assistant Examiner*—James D. Hamilton

[57] ABSTRACT

This disclosure describes an electrical and pneumatic device for picking fruit, particularly citrus fruit, by severing the fruit from its stem with an electrical current, or pulling the fruit from its stem pneumatically by applying a suction cup to the side of the fruit and physically pulling the fruit from its stem, or by using a combination of electrical current and pneumatic (vacuum) force to sever the fruit from its stem.

11 Claims, 7 Drawing Figures

ELECTRO-PNEUMATIC FRUIT PICKER

BRIEF SUMMARY OF THE INVENTION

The inventor has demonstrated by experiment that citrus fruit can be severed from its stem by a suddenly applied high voltage charge of electricity. The electrical charge is applied to the side of each piece of fruit and to the trunk of the tree (or through surrounding earth and roots to the trunk) thereby causing a high amperage current of very short duration to flow through the fruit, through its stem and through the limbs to the trunk to complete the electrical path. The high intensity current ruptures a thin membrane in the navel of the fruit at the juncture of the stem, thereby severing the fruit from its stem without damage to the fruit.

The inventor has further demonstrated by experiment that a vacuum applied to the side of the fruit by means of a pliable suction cup exerts sufficient pneumatic force (generally more than ten times the weight of the fruit) to pull certain mature citrus fruit from its stem, cleanly at the navel.

The complete invention, using either the electrical means to sever the fruit, or the pneumatic means to pull the fruit, or by using the two means in varying combination will afford the complete means to meet a wide range of field conditions, varieties of fruit, and desired degree of maturity and ripeness.

THE DRAWINGS

Figure 1:
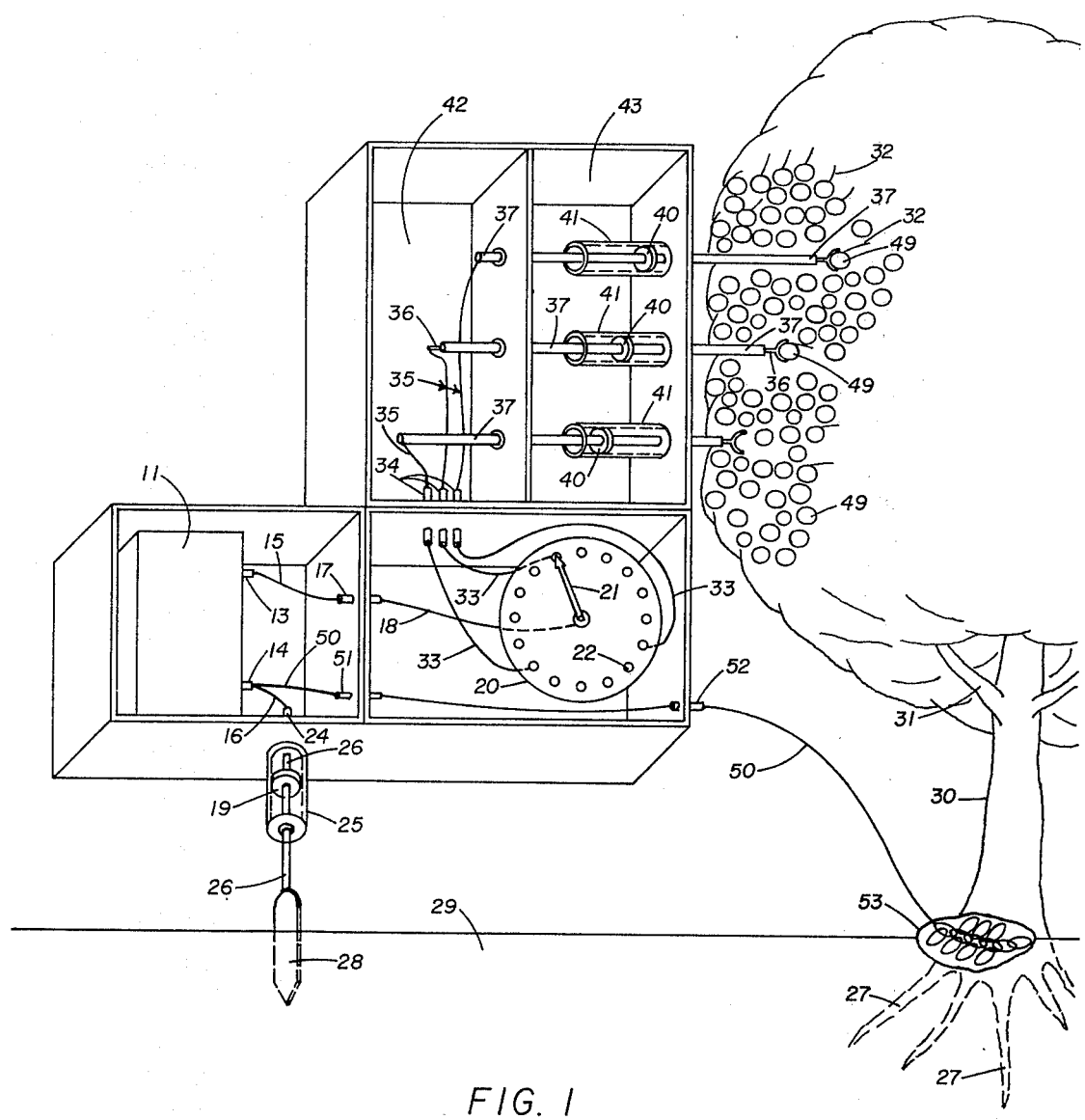

FIG. 1 shows the fundamentals of the invention in an over-simplified manner. FIG. 1 is provided only to illustrate the new concept and to describe the application of the new principles to be applied. It is not intended that the invention shall have the configuration shown in FIG. 1.

Figure 2:
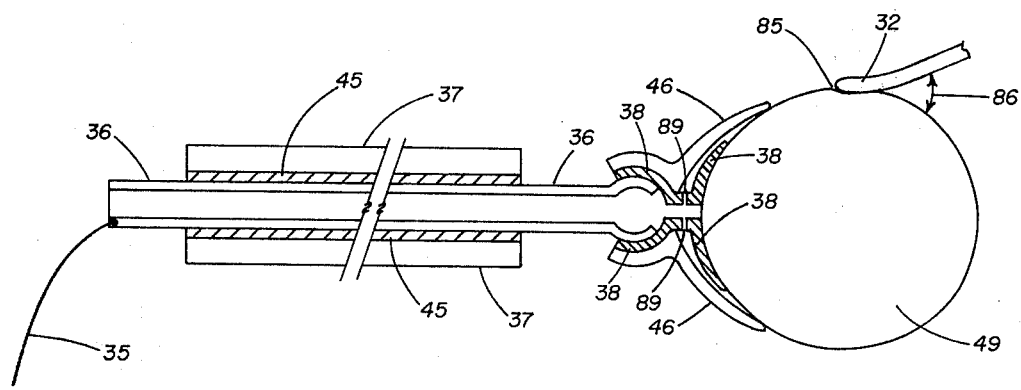

FIG. 2 shows the suction cup and contact button which holds the fruit by applied vacuum and contacts the fruit electrically by pressing the contact button against the side of the fruit. The suction cup and contact button are held by a slide rod which moves the cup and button in and out of the periphery of the tree. FIG. 2, together with FIG. 1, shows how the fruit is held pneumatically (with a vacuum) and contacted electrically for pulling or severing the fruit from its stem.

Figure 3:
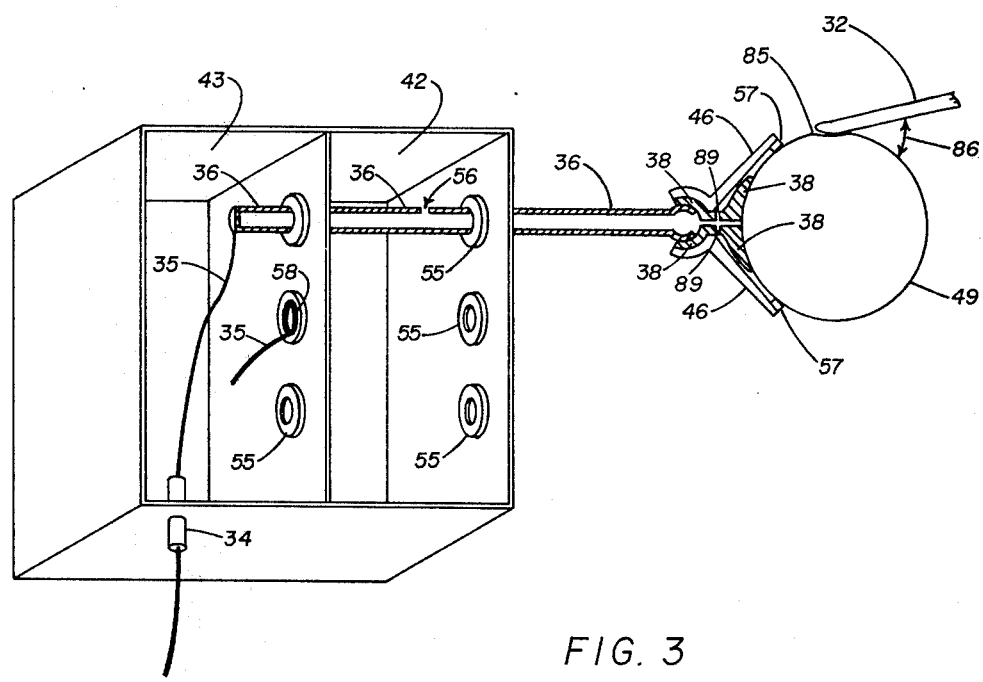

FIG. 3 shows an alternate arrangement of the pressure chamber, pressure-vacuum chamber and slide rods shown in FIGS. 1 and 2. The arrangement in FIG. 3 is preferred, and will be mounted on the end of a maneuverable boom to become a quick-moving "picker head".

Figure 4:
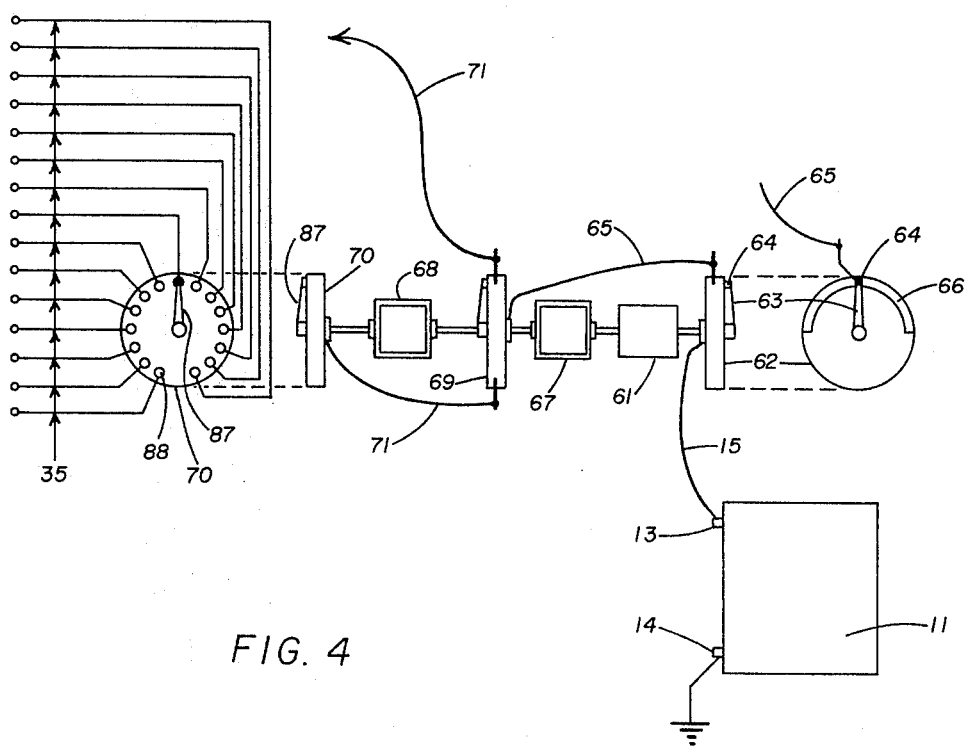

FIG. 4 shows the sequencing device for applying the electrical charge first to one piece of fruit, then to the next piece of fruit in that row of fruit contactors, and so on until all fruit being contacted by the fruit contactors have received an electrical charge, thereby severing all the contacted fruit. The sequencing device in FIG. 4 is preferred to the sequencing switch in FIG. 1, as FIG. 1 was over-simplified in order to illustrate the new concept.

Figure 5:
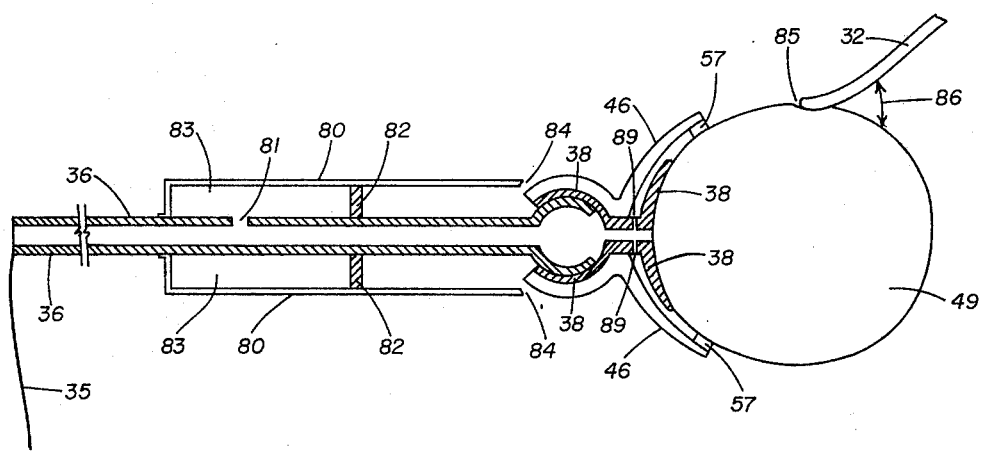

FIG. 5 shows a clamping device on the slide rod for clamping the swiveling suction cup and contact button at whatever angle they are at relative to the fruit, and also shows a sealing ring for better sealing the suction cup against the fruit. These features provide a better vacuum (pull) and prevent the fruit from swiveling and being "plugged" when it is picked.

Figure 6:
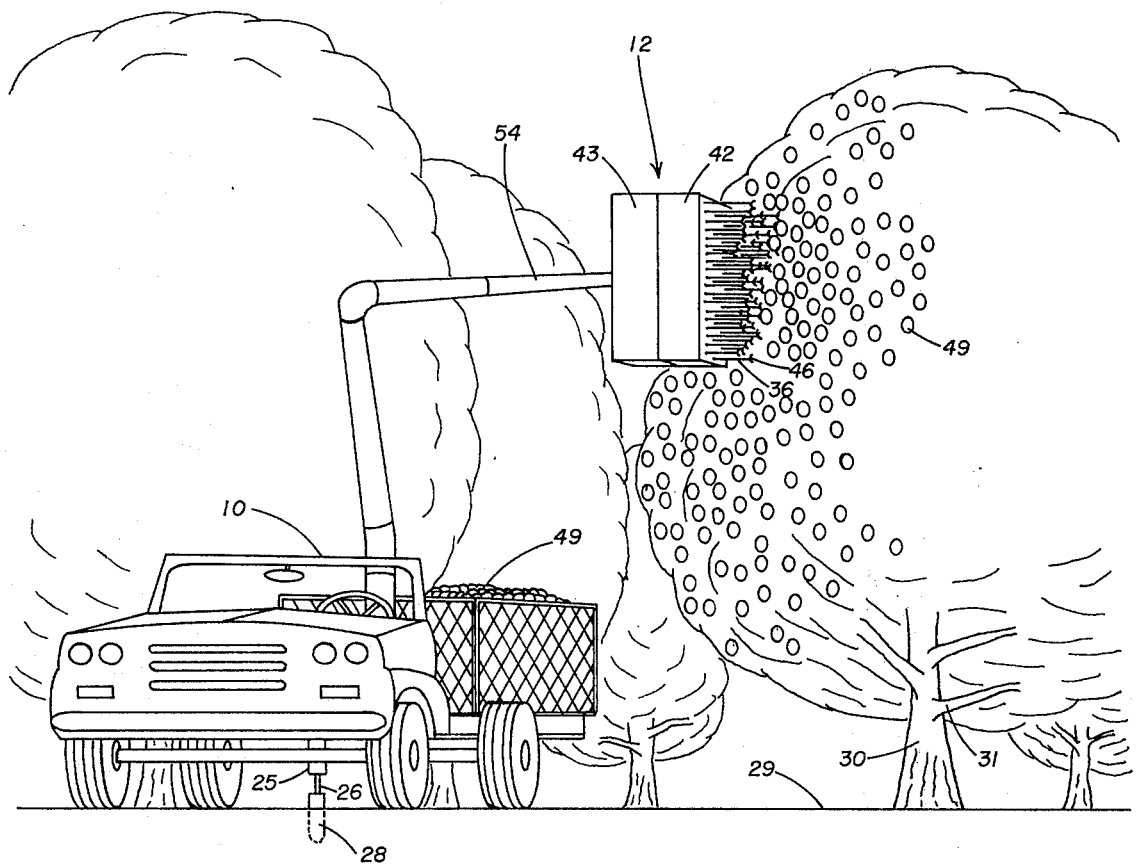

FIG. 6 shows the embodiment of the invention, with many rows and tiers of the fruit contacting devices assembled to the vacuum and pressure-vacuum chambers, to form the "picker head", mounted on a maneuverable boom for quickly moving the contacting devices in, out and around the periphery of the tree. FIG. 6 also shows the vehicle for receiving the fruit after it is picked and hauling it or unloading it onto another vehicle.

Figure 7:
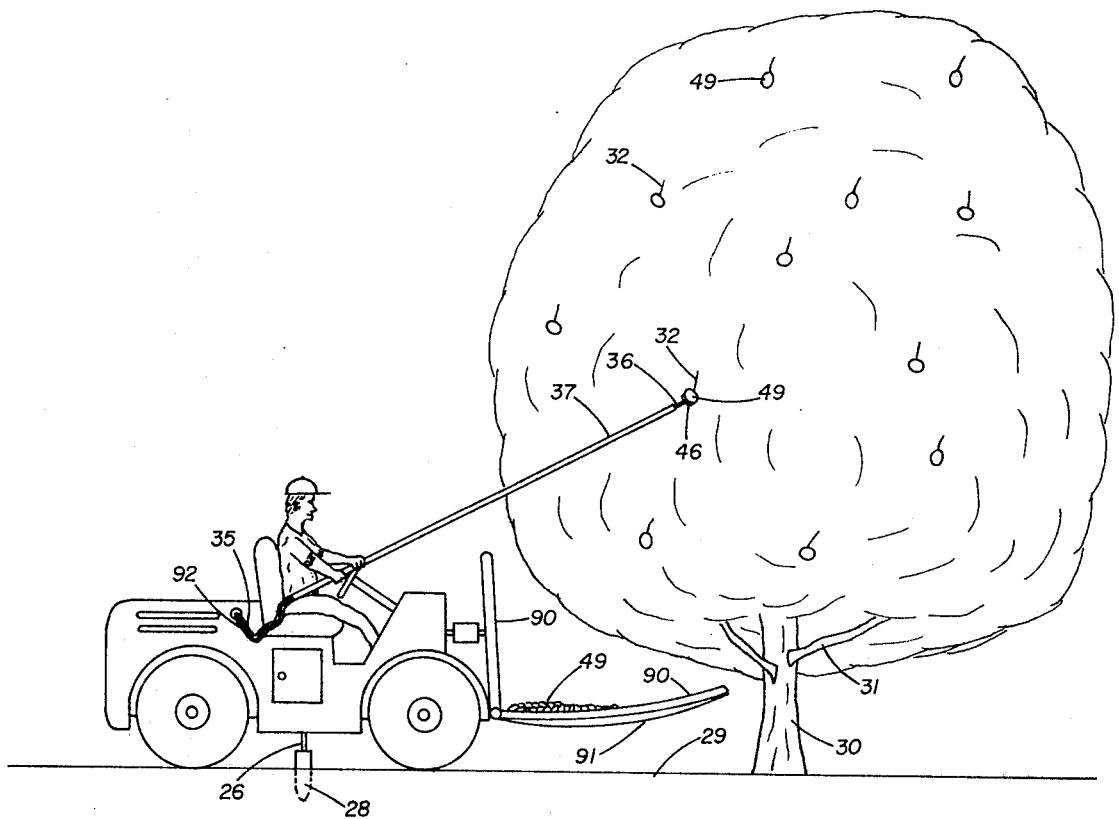

FIG. 7 is an alternate vehicle and picker arrangement for picking small grove areas or quick clean-up picking of any fruit left by the version depicted in FIG. 6. Here a fruit catcher arrangement (shown under the tree) is employed. The operator of the version shown in FIG. 7 would move a single fruit contacting device quickly from one piece of fruit to the next, without any climbing or direct handling of the fruit.

The invention herein described is designed such that fruit, particularly citrus fruit, can be picked from its tree using only pneumatic (applied vacuum) means, or it can use electro-pneumatic (electrical and pneumatic) means.

The invention can be built, and will pick certain fruit with only the pneumatic means. However the electro-pneumatic version of the invention is more positive in its action, more selective of the ripeness of the fruit, and will adapt to a wide range of field conditions, and varieties of fruit. In addition, the electro-pneumatic version affords the means of branding or marking the fruit with a design or trademark as it is picked.

Essentially, the difference between the two versions is that if the electrical means herein described are omitted from the electro-pneumatic version, then the pneumatic version would be the result.

The pneumatic version operates on the principle of applying a spherical-shaped suction cup against the side of the piece of fruit, drawing a vacuum inside the cup to hold the fruit securely, then moving the suction cup sidewise (and also upward if necessary) to pull the fruit away from its stem. The angle of the stem relative to the fruit when it is pulled is such that the stem pulls out clean at the navel instead of plugging the fruit (severing the stem cleanly at the navel results from the sidewise and upward movement of the fruit as it is being pulled from the stem).

The electro-pneumatic version operates on the principle of passing a sudden jolt of electricity through the fruit and its stem, to sever the fruit from its stem electrically. This version can pick the fruit by use of the electric current only, or the electric current can be used in combination with a physical pull using the pneumatic means.

Since the electro-pneumatic version embodies all of the features of the pneumatic version, the electro-pneumatic version will be described first.

The inventor has demonstrated by experiment that certain fruit, particularly citrus fruit, can be severed from its tree by a suddenly applied charge of electricity of the proper voltage and current. As a heavy bolt of lightning explodes a tree trunk by instantly turning the moisture in the trunk into high pressure steam, a miniature "bolt of lightning" explodes a thin membrane inside the navel at the juncture of the fruit and its stem to thereby separate the stem from the fruit cleanly at the navel. No damage is done to the fruit, but if desired, one side of the fruit (where electrical contact is made) can be etched with a brand or trademark, by a design in the contact which touches the side of the fruit.

The inventor has also demonstrated by experiment that a vacuum applied to the side of an orange by means of a pliable, spherical-shaped suction cup will hold the fruit securely such that certain varieties of fruit when mature may be picked by the pull of the vacuum alone, and in any event is more than adequate to hold the fruit while being severed electrically and while moving fruit over a vehicle for loading (by releasing the vacuum).

Referring to the drawings, the Electro-Pneumatic Fruit Picker in FIG. 1 is shown (as if suspended in mid air) to illustrate the means of applying said proper electrical charge and current to the fruit to be picked, and further to show the means of applying the proper vacuum to hold the fruit for making the electrical contact and holding the fruit for loading on a vehicle or into a container. It is to be emphasized that FIG. 1 is not the configuration of the invention but is used primarily to illustrate the principles employed.

Referring again to FIG. 1, a high voltage power supply 11 takes power from a conventional alternator elsewhere on the vehicle (not shown), steps it up to the proper voltage and current, and this voltage appears at terminals 13 and 14.

One pole (or polarity) of the voltage is applied to the piece of fruit to be picked 49, by way of terminal 14, wire 16, terminal 24, rod 26, blade 28, earth 29, tree root 27, tree trunk 30, tree limb 31, and fruit stem 32. Alternately a better connection can be made to the piece of fruit 49, by way of terminal 14, wire 50, through bushings 51 and 52, to a wire mesh bag filled with metal chain 53. The wire mesh bag and metal chain are placed against the roots 27, and base of tree trunk 30, thereby forming a good electrical connection. This alternate eliminates wire 16, terminal 24, rod 26, blade 28, piston 19, and cylinder 25. A chain or wire mesh bag containing chain could be laid onto or across the tree's limbs to make the desired connection.

The other pole (or polarity) of the voltage is applied to the piece of fruit by way of terminal 13, wire 15, bushing 17, wire 18, rotary contact 21 of sequencing switch 20, wire 33, bushing 34, wire 35, inner conductive tube 36 (FIG. 2) of slide rod 37, and fruit contacting button 38.

In operation, the picker is placed alongside the tree to be picked, and pneumatic pressure is applied to pneumatic cylinder 25 and piston 19, thereby driving blade 28 into the earth to make contact with the earth.

Pneumatic pressure is then applied to pressure-vacuum chamber 43, by conventional means, thereby applying pressure to the left-hand side of operating pistons 40 by way of the open left-hand ends of operating cylinders 41. This pressure on the left-hand side of pistons 40 drives the slide rods 37 to the right until physical contact is made with the fruit by sphere sector contacting device (46 and 38) at the right-hand end of the slide rods.

FIG. 2 shows the construction of slide rod 37 with its electrically conducting inner tube 36 and insulating tube 45, and the sphere sector contacting device (46 and 38), which makes the contact with the fruit. The sphere sector contacting device is attached to the slide rod assembly by swivel arrangement to allow it to swivel into any desired position to fit against the fruit, in the event that it does not make physical contact with the fruit squarely. It is, however, generally held in the position shown in FIG. 2 by a small spring (spring not shown).

The sphere sector contacting device consists of a contact button 38 and suction cup 46, which are rigidly fixed to each other, but both swivel as a unit on the spherical-shaped right-hand end of conducting inner tube 36. The contact button 38 is made of metal, and the suction cup is made of slightly flexible plastic or of rubber. Both the contact button 38, and the suction cup 46 are spherical in shape at the right-hand surfaces to provide a good fit against the fruit to be picked.

After sphere sector contactors are in contact with the fruit, a vacuum is applied to vacuum chamber 42 by conventional means, thereby drawing air through the inner tubes 36 and contact buttons 38, creating a vacuum in the space between the fruit and the sphere sectors. This vacuum in turn pulls the fruit securely against the contact buttons 38, to form a good electrical contact with the fruit.

Once the electrical connection with the fruit has been completed as described above, an electrical charge of proper voltage, current and frequency and duration is issued forth from the high voltage power supply 11, and through the electrical pathways previously described, to the first piece of fruit to be picked, as determined by the position of the rotary contact 21 on the sequencing switch 20. As shown in FIG. 1, the rotary contact is in position to direct the electrical charge to the middle slide rod. Only 3 slide rods are shown for the sake of clarity of the drawings, but the actual invention shall contain many horizontal rows of slide rods, with many slide rods in each row, thereby forming a bank of slide rods so numerous that the sphere sectors are almost touching each other in both the horizontal and vertical directions.

If a sphere sector enters the tree periphery at a point having no fruit, no contact will be made, except occasional contact with a leaf or twig, and no harm will be done when voltage is applied to that slide rod and contact button.

The bottom row of slide rods and contact buttons will be energized first, and in rapid succession by the rotation of rotary contact 21, thereby severing fruit in the bottom row first. The voltage will then be applied sequentially and rapidly to the next row up etc., until all contacted fruit has been picked.

While the fruit is being severed as above described, the pressure in chamber 43 is released, and as soon as the last fruit is severed a vacuum is applied to chamber 43 to move the pistons 40 to the left and thereby withdraw all the fruit contactors from the periphery of the tree. A vacuum is maintained in chamber 42 to securely hold all the picked fruit while withdrawing the contactors.

While FIGS. 1 & 2 were used to best describe the principles used, FIGS. 3 & 4 show the preferred arrangement of the basic components. FIG. 3 shows a reversed arrangement of the chambers 42 & 43. The pressure-vacuum chamber 43 has been switched in position with vacuum chamber 42.

The reason for this switch will now be described referring to FIG. 3. Slide rod 37 and insulating tube 45 have been eliminated. Inner conductive tube 36 is now the "slide rod", and is simply a conductive tube closed off at the left-hand end, and with a hole 56 drilled through one wall, in the portion of the tube which is confined to vacuum chamber 42.

The conductive tube 36, is free to slide right or left through insulating bushings 55. Wire 35 is connected to the closed-off left-hand end of conductive tube 36.

In operation, pressure is first applied to chamber 43, and this pressure forces all the conductive tubes, which now act as pistons, to the right until the fruit is contacted by the sphere sector contacting devices at the right-hand end of the tubes.

When the sphere sector contacting device is in physical contact with the fruit to be picked, a vacuum is then applied to chamber 42. This vacuum sucks air out of the tube 36 through the hole 56, until the fruit is drawn tightly against the contacting button 38. Air drawn through air passage 89 maintains the vacuum between sphere sector 46 and the fruit, to securely hold the fruit for severing electrically or for pulling pneumatically (or any combination of electrical or pneumatic means).

A further improvement of the sphere sector contacting device is an addition of a sponge rubber 57 to the suction cup 46, to afford a positive air seal between the suction cup and the fruit.

The fruit is then severed from its stem by the electrical charge and current, or picked pneumatically by moving tube 36 and sphere sector contacting device 38 & 46 to the left, by means to be described later, to apply a physical pull to the fruit. After the fruit is severed from its stem, the conductive tube is then withdrawn from its extended position by applying a vacuum to chamber 43.

An alternate method of connecting wire 35 to conductive tube 36 is shown in FIG. 3. This is illustrated by showing a dark (metallic) ring 58 inside the middle insulating bushing 55 (in the left-hand chamber). The conductive tube 36 will slide left or right inside this metal ring, thereby making contact between wire 35 and tube 36. This will prevent wires 35 from swinging back and forth, subjecting them to breakage.

The sequencing switch 20 in FIG. 1 is over-simplified in order to show the basic concept of sequencing the electrical charge and current from one sphere sector contacting device to the next. FIG. 4 shows power supply as shown in FIG. 1, and terminals 13 and 14 are the same as in FIG. 1. Wire 15 connects terminal 13 to the sequencing device.

Still referring to FIG. 4, drive motor 61 rotates wiper arm 63 and contact 64 on rotary contactor 62, making contact with metallic half-ring 66, when arm 63 is in the upper half of its rotation. Therefore, rotary contactor 62 connects wire 15 to wire 65 during the upper half of the rotation of arm 63.

Motor 61 also drives rotary contactor 69 through reduction gear 67, and drives rotary contactor 70 through reduction gear 68. Contactor 69 is the same as contactor 70, but no end view of contactor 69 is shown.

In this illustration (FIG. 4) there are 15 contacts on each of the contactors 69 & 70. There are actually 15 wires 71 leaving contactor 69, going to contactor 70 and 14 more contactors just like 70 and on the same shaft with 70 (the other 14 contactors like 70 are not shown for the sake of simplicity and clarity). Only two wires 71 are shown leaving contactor 69, whereas there are actually 15 wires going to 15 contactors like contactor 70.

The 15 wires leaving contactor 70 correspond to wires 35 in FIG. 1, and are therefore marked 35 in FIG. 6. These 15 wires go to 15 sphere sector contacting devices, all in one horizontal row, say all in the bottom row. The next contactor like 70 (not shown) also has 15 wires leaving it, going to the next to the bottom row of conductive tubes and sphere sector contacting devices. This would be the second horizontal row from the bottom. The next contactor (the 3rd) like 70 would be similarly connected to the third from the bottom row of conductive tubes and sphere sectors, and so forth until there are 15 horizontal rows, with 15 fruit contacting devices in each row. The number 15 is used only to be illustrative, the actual number of horizontal rows, sphere sector contacting devices per row, and the number of rotary contactors like 69 and 70 may be more or less than the 15 used in this illustration.

At any rate, the electrical charge and current delivered by the above described sequencing device will cause the bottom row of fruit to be severed rapidly and sequentially, and then the second row to be severed, and so forth until all the contacted fruit is severed and ready for loading.

FIG. 5 exactly repeats the conductive tube 36 and the sphere sector contacting device 38 and 46 shown in FIG. 3, but in addition, FIG. 5 shows a clamping device for holding the suction cup at whatever angle it makes contact with the fruit. Movable cylinder, 80, is free to move on slide rod 36 and on fixed piston 82. After sponge rubber ring 57 seals between suction cup 46 and fruit 49, a vacuum will build up inside slide rod 36, and this vacuum will be applied to space 83, through hole 81. Ths vacuum in space 83 will then drive cylinder 80 toward suction cup 46 until clamping tips 84 are in firm contact with the swivel portion of suction cup 46, thereby clamping the suction cup tightly in the position at which it came to rest against the fruit.

The preferred embodiment of the invention is shown in FIG. 6. Here a "picker head" 12 consisting of the pressure-vacuum chamber 43 and vacuum chamber 42 and many rows and tiers of conductive tubes 36 and contacting devices 38 and 46 are all assembled on the end of a maneuverable boom 54. With this arrangement the vehicle 10 can stand in one spot while the picker head 12 is quickly and easily moved as desired, to cover a large area at the periphery of the tree.

The power source is a conventional alternator located within the vehicle 10, and is not shown. The power supply 11 and sequencing device shown in FIG. 4 are mounted inside the vehicle and are not again shown in FIG. 6.

The operation of the picker head 12 in FIG. 6 is exactly as described above in reference to FIGS. 3 & 4. The vehicle 10 is moved into a convenient position near the tree and blade 28 is inserted into the earth by pneumatic pressure. The operator swings the picker head 12 to a position near the fruit 49 to be picked. Pneumatic pressure is then applied in chamber 43, thereby forcing all conductive tubes to the right (by piston action) until all sphere sector contacting device 38 and 46 come to rest against fruit 49 (or if a contacting device enters the tree where no fruit is present it will stop when reaching the end of its travel or when hitting a limb or branch).

When, or just before, the contacting devices 38 & 46 reach the fruit, a vacuum is applied, by conventional means, to chamber 42 and vacuum will be applied through hollow conductive tubes 36, contact buttons 38, and through vent holes 89, (see FIGS. 2, 3, & 5) to suction cups 46, and said vacuum will grasp and securely hold the fruit 49 for severing electrically as above described, or for pulling the fruit by pneumatic (vacuum) force (or for severing by any combination of the electrical and pneumatic means).

When the fruit has been contacted and is firmly held, the proper electrical charge is quickly and sequentially applied to all the contacted fruit, as above described, until the contacted fruit has been severed.

With the fruit all still being firmly held by the vacuum the operator swings the boom 54 and picker head 12 to the left and over the vehicle 10, and then releases the vacuum from chamber 42, which in turn releases the vacuum from suction cups 46, thereby allowing the fruit 49 to drop into the vehicle 10. p While the picker head is moving to the left to load the picked fruit on the vehicle, a vacuum is applied to chamber 43 and all conductive tubes 46 (and attached contacting devices) are withdrawn to the left by piston action, to return them all to their original position.

The operator then moves the picker head to a new position and the above described cycle is repeated until all the fruit that can be reached from that position of the vehicle is picked and loaded. Fruit on the tree to the left of the vehicle may be picked without moving the vehicle by swiveling the picker head to the left side of the boom. After all fruit that can be reached from that position of the vehicle has been picked and loaded, blade 28 is withdrawn, the vehicle is moved, and the picking cycle is repeated.

This completes the description of the electropneumatic version of the invention. The electropneumatic version will have the advantage that it may use only an electrical charge to sever the fruit, or may use any desired combination of physical pull and electrical charge and current to pick the fruit. This will give a great amount of flexibility and selectivity of the degree of ripeness of the fruit to be picked, and will allow maximum adjustment to varying field conditions.

The pneumatic version is identical except that all the electrical equipment and devices above described are omitted. The operation of the pneumatic version is also identical to the operation above described except that no electrical charge is applied to the fruit and the fruit is severed by the physical pull of the vacuum applied to the fruit by means of the suction cups 46 and by swinging the picker head to the left to exert a physical pull to the fruit.

FIG. 7 shows a small, highly maneuverable electropneumatic (or pneumatic) fruit picker for picking very small groves or for picking trees having only a small amount of fruit on them. The principles applied are identical to those described for the fruit picker in FIG. 6. However, the only electrical equipment needed for this version is an alternator, power supply 11, and one fruit contacting device. The conventional alternator and power supply 11 are not shown.

The vacuum for grasping and holding the fruit 49 is applied through flexible insulating hose 92, hollow conductive tube 36, and suction cup 46. The electrical charge for severing the fruit is applied through wire 35 (inside insulating hose 92), conductive tube 36 and contacting button 38 (not shown in FIG. 7), and through rod 26, blade 28, earth 29, tree trunk 30, limb 31 and fruit stem 32. Insulating rod 37 and insulating hose 92 prevent shock to the operator.

The operator of the fruit picker in FIG. 7 directs the contacting device 38 and 46 to each piece of fruit. Vacuum is applied to the fruit by suction cup 46 for manually pulling the fruit from its stem or an electrical charge is applied to sever the fruit (or a combination of physical pull and electrical charge is used).

After the fruit is severed it is moved by the operator over the canvas or plastic fruit catcher 91, which is held by frame 90, and the fruit is then released into the catcher 91 by releasing the vacuum which holds the fruit. The frame 90 can be raised and tilted as with a conventional fork truck for loading the fruit into another vehicle or container.

Referring to FIGS. 2, 3 & 5, the right hand side of contactor button 38 can have a brand or trademark raised on the spherical surface of the button, and the electrical current which severs the fruit, as above described, will burn or etch the brand or trademark upon the surface of the fruit.

I claim the following:

1. A fruit picker device primarily intended for picking citrus fruit, said device comprising: vacuum means operatively attached to one end of extendable vacuum conduit means, and with suction cup means (operatively attached to the other end of) attached to the other end of said conduit means by angle positioning and locking means, whereby said suction cup means upon contacting said fruit will be positioned and locked in the desired angle relative to said conduit means, wherein said suction cup means comprises a resilient, substantially spherical cup, with central portion of said cup partially closed to prevent passage of said fruit through said cup, and wherein said suction cup means is in fluid communication with said vacuum means, such that said suction cup means may be placed in close proximity of said fruit by said extendable conduit means, and said suction cup means may grip said fruit by drawing a partial vacuum through said conduit means.

2. A fruit picker device of the type primarily intended for picking citrus fruit, said device comprising: vacuum means; conduit means, one end of said conduit means being operatively attached to said vacuum means; suction cup means (operatively attached to the other end of said conduit means and in fluid communication with said vacuum means, for engaging said fruit) attached to the other end of said conduit means by angle positioning and locking means, whereby said suction cup means upon contacting said fruit will be positioned and locked in the desired angle relative to said conduit means, said suction cup means being in fluid communication with said vacuum means for engaging and gripping said fruit; and electrical severing means operatively disposed in fruit contacting relation in said suction cup means whereby electricity may be directed through said fruit to remove said fruit from its stem.

3. A fruit picker device of the type primarily intended for use in picking citrus fruit, said device comprising: boom means and pneumatic head means operatively attached to one end of said boom means for engaging said fruit, wherein said pneumatic head means comprises pressure chamber means disposed in fluid communication with a source of fluid; vacuum chamber means disposed in fluid communication with a vacuum pump; and at least one slide rod means movably disposed within said pressure chamber means and said vacuum chamber means, said slide rod means comprising fluid conduit means, one end of said conduit means being closed and said closed end being disposed within said pressure chamber means; an aperture being formed in said conduit means in fluid communication with said vacuum chamber means; and suction cup means comprising a resilient, substantially spherical cup pivotally disposed on the other end of said conduit means in fluid communication with said conduit means, whereby said boom means may be utilized to position said pneumatic head means in proximity to said fruit to be picked, said slide rod means may be extended into contact with said fruit, and said suction cup means may grip said fruit by drawing a partial vacuum through said conduit means.

4. A fruit picker device of the type primarily intended for use in picking citrus fruit, said device comprising: boom means; pneumatic head means operatively attached to one end of said boom means for engaging said fruit; and electrical severing means operatively disposed in fruit-contacting relation on said head means whereby electricity may be directed through said fruit to remove said fruit from its stem, wherein said pneumatic head means comprises pressure chamber means disposed in fluid communication with a source of fluid; vacuum chamber means disposed in fluid communication with a vacuum pump; and at least one slide rod means movably disposed in interconnecting relation between said pressure chamber means and said vacuum chamber means, whereby said slide rod means may be extended and retracted in response to predetermined pressure changes in said pressure chamber means and, further, whereby at least a partial vacuum may be drawn on said slide rod means to graspingly engage said fruit to be picked.

5. A device as in claim 4 wherein said slide rod means comprises fluid conduit means, one end of said conduit means being closed and said closed end being disposed within said pressure chamber means; an aperture being formed in said conduit means in fluid communication with said vacuum chamber means; and suction cup means disposed on the other end of said conduit means in fluid communication with said conduit means, whereby reaction of a partial vacuum with said vacuum chamber means will cause said suction cup means to grip said fruit to be picked when said suction cup means is positioned contiguous to said fruit.

6. A device as in claim 5 wherein said suction cup means comprises a resilient, substantially spherical cup.

7. A device as in claim 5 wherein said suction cup means is movably disposed on said other end of said conduit means.

8. A device as in claim 4 wherein said electrical severing means comprises a source of electrical energy; a fruit-contacting button mounted on said head means in electrical contact with said source of electrical energy; and grounding means removably disposable in circuit-completing relationship between said button and said source, whereby electrical energy may be passed through said fruit to be picked.

9. A device as in claim 8 wherein said electrical severing means further comprises switch means operatively disposed in current-regulating relation between said source and said button, whereby the flow of electrical energy may be regulated.

10. A device as in claim 8 wherein said button comprises an electrical contact contiguously disposed on a gripping portion of said pneumatic head means.

11. A device as in claim 8 wherein said grounding means comprises a blade removably disposable in the growth medium for said fruit to be picked, whereby electrical energy will pass through said fruit, rupturing the membrane attached said fruit to its stem.

* * * * *